Sept. 14, 1965 J. S. MATTERN 3,206,295
LINED GLASS FURNACE
Filed Jan. 2, 1962

INVENTOR.
JOHN S. MATTERN
BY
ATTORNEYS

United States Patent Office 3,206,295
Patented Sept. 14, 1965

3,206,295
LINED GLASS FURNACE
John S. Mattern, North Chili, N.Y., assignor to Bausch & Lomb Incorporated, Rochester, N.Y., a corporation of New York
Filed Jan. 2, 1962, Ser. No. 163,458
2 Claims. (Cl. 65—178)

This invention relates to a glass making furnace and more particularly to a means of reducing erosion of the refractory material and joining a refractory section of a furnace to a metal lined section. Such means of joining offers a more efficient means of heating this tunnel section, reduces erosion of the refractory material adjacent to this tunnel area and effectively prevents glass leakage at this joint.

The process of glass making comprises melting, fining and homogenizing of the glass prior to extruding and annealing. The raw batch constituents are charged in the glass furnace and melted by the high temperatures within the furnace.

The melting chamber is usually separated from the fining chamber by a bridging wall having a submerged throat permitting the flow of melted glass to the fining chamber. Bubbles of gas preferably air are injected into the throat connecting the melting chamber and the fining chamber causing bubbles to pass through the melted glass. The air bubbles in the fining chamber rise to the surface and are permitted to escape from the furnace. The air bubbles introduced in the throat also pass into the melting chamber and rise upwardly to the surface of the melting glass. The bubbles collect the minute bubbles in the molten glass thereby reducing the air content of the bubbles in the molten glass. Gas bubbles contained in the glass are generally caused by decomposition of the raw materials and also air entrapped in the raw batch as it is charged in the furnace. These gases usually comprise oxygen, nitrogen, carbon dioxide, carbon monoxide and water vapor. With the introduction of air through the process of adhesion and cohesion the minute bubbles collect on the large bubbles introduced into the molten glass and thereby rise to the surface and escape from the furnace.

The furnace employed in this glass making process as illustrated contains a lining of a suitable metal such as platinum which is impervious to erosion from the molten glass and air at high temperatures present within the fining chamber. The melting chamber, however, is constructed of refractory material which is subject to erosion from the glass and particularly erosion caused by the contact of air and molten glass as it passes over the refractory surface. The erosion seriously limits the life of the furnace.

A melting chamber lined with platinum, however, is subject to alloying due to its combining with raw batch constituents under certain conditions. The refracting material is not subject to this type of alloying.

The platinum tunnel section may be butted against the refractory throat and water cooled to prevent leaking. Misalignment or erosion of the throat frequently results in glass leaking from around the water cooled flange. Excessive cooling to seal the leak, however, could result in flow interruption.

Accordingly, this invention is intended to overcome these problems by providing a platinum lined fining chamber and tunnel extending through the refractory throat and flanged inside the melter. Angling the flange at the top within the melter deflects the air bubbles remote from the refractory surface in the melting chamber and eliminates the erosive effect of the combined air and molten glass upon the refractory area at the throat and surrounding area in the melting chamber. Little or no erosion or alloying of the liner occurs in this section of the melter because of the advanced stage of the melting operation.

It is an object of this invention to provide a metal liner extending from the fining chamber into and flanged inside the melting chamber thereby providing a means of conducting heat throughout the tunnel area and preventing a restriction to glass flow.

It is a further object of this invention to provide a protruding flange deflecting the bubbled air to a point remote from the refractory material in the melting chamber to eliminate erosion of the refrecatory material.

It is a further object to provide a seal by means of the expandable metal liner within the refractory throat of the furnace.

The objects of this invention are accomplished by providing a platinum lined fining chamber intermediate of the homogenizing chamber and the melting chamber. The platinum lining resists erosive effects of the molten glass and gases of the high temperature accompanying the glass making process and thereby greatly extends the life of the furnace. Air bubbles are introduced inside the platinum lining which are permitted to pass through the molten glass and rise to the surface and escape from the furnace. The air bubbles are also permitted to pass through a passage in the glass furnace communicating between the fining chamber and the melting chamber. The refractory material on the inner surface of the melting chamber is relatively impervious to erosion caused by raw batch constituents but does not have the non-erosive characteristics of platinum when subjected to hot gases. The air, however, being transmitted to the melting chamber from the fining chamber is deflected to a point remote from the refractory inner surface of the melting chamber to eliminate the erosive effect of air and molten glass on the refractory inner surface. The air then rises to the surface of the glass in the melting chamber causing a limited degree of stirring and also causes a purifying effect removing gaseous substances contained within the molten glass. This feature greatly extends the life of the furnace.

An added safety feature is included in event of rupture of the metal liner in the tunnel. A tubular liner forms the tunnel within the refractory throat intermediate of the fining chamber and melting chamber. In the event of rupture, the glass being in a molten state will flow in small cracks or crevices thereby presenting a problem of the glass leaking between the platinum and the refractory wall to a point external of the furnace. This problem is overcome by placing a flange on the external part of the tubular structure which abuts against the refractory on the outside of the furnace. Water is circulated through a coil engaging the flange to cool any glass reaching the flange from the inside of the furnace. The cooling caused by the circulation of water is sufficient to solidify the glass and preventing the glass from passing between the flange engaging the refractory on the outside of the furnace.

The heating elements in the fining chamber of the furnace are provided through glow bars which are resistive elements connected through a source of electrical energy. The glow bars are raised to a high temperature for radiation of heat which is conducted into the fining chamber to maintain an accurately controlled high temperature in the fining chamber. A gas heating device is also provided in the melting chamber as well as the homogenizing chamber. The platinum provides a good conduction of heat from the melting and fining chambers through the passage to provide continuity of flow from the melting chamber to the fining chamber.

The following figures illustrate the preferred version within the glass furnace. Various modifications of this device might be devised which may fall within the spirit of the invention of which a preferred version is illustrated in the following figures.

Figure 1:
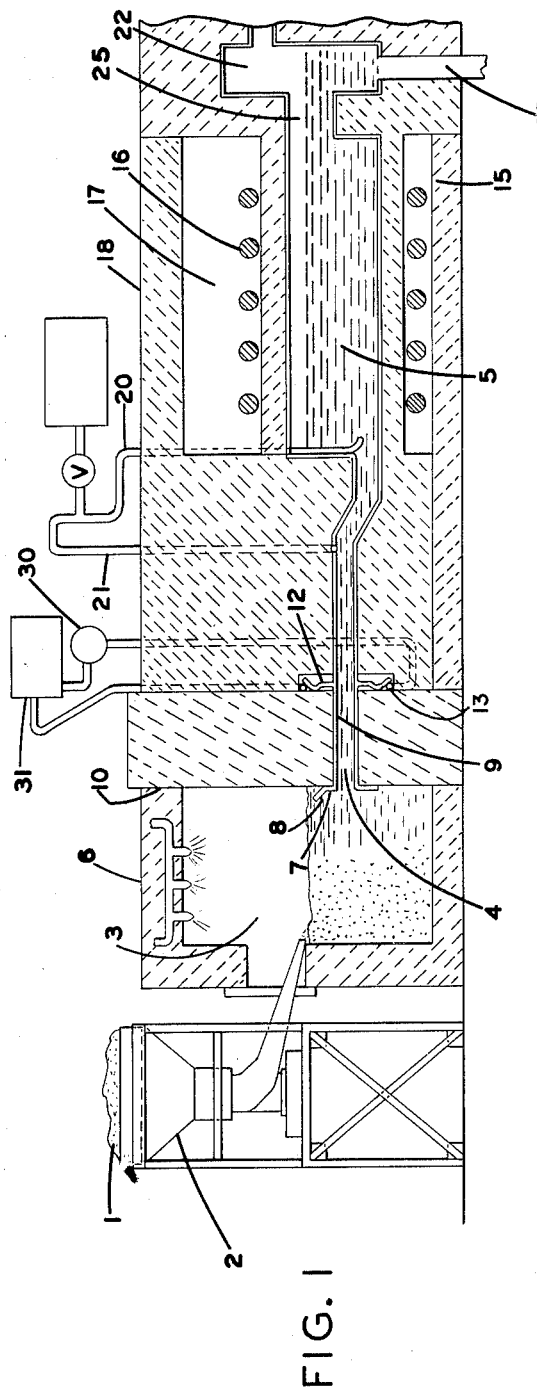
FIG. 1 illustrates the general layout of the glass furnace.
Figure 2:
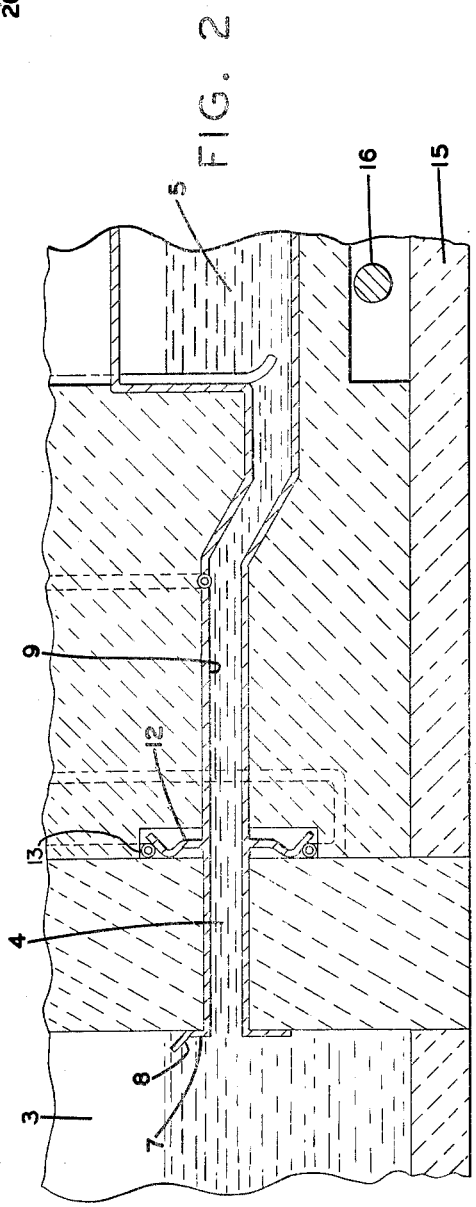
FIG. 2 illustrates a more detailed cross section of the platinum tunnel section within the refractory throat and the deflecting flange in the melting chamber.

The raw batch 1 is contained within the automatic batch feeding mechanism 2 which feeds into the melting chamber 3. The melting chamber is heated to melt the constituents of the batch fed into the chamber. The melting chamber contains glass in the various states of solid raw batch constituents to partially melted to the completely melted state. The glass when melted will flow through the passage 4 which feeds into the fining chamber 5. The melting chamber is constructed of a refractory material 6 such as zironium. The refractory passage leading between the fining chamber 5 and the melting chamber 3 is lined with platinum. A flange 7 extends radially from the inner periphery of the passage 4. A portion 8 of the flange 7 is positioned vertically above the opening of passage 4. Any air passing through the passage to the melting chamber 3 will move vertically upward and be deflected by the deflector portion 8. The tube 9 extends into the refractory wall 10 and is integral with the flexible flange 12. The tube 9 forms the passage extending into the fining chamber. To eliminate any chance of leakage about the outer periphery of the tube 9 by the flange 12 the cooling coil 13 is cooled by the fluid circulating from a reservoir 31 by a pump 30. The cooling fluid solidifies any glass and prevents any leaking beyond the flange 12. The flexible flange 12 also provides an expansion joint between the refractory wall 10 and the tube 9.

The tube 9 is formed integral with the platinum lining for the fining chamber 5. The fining chamber 5 is surrounded by the firebrick 15 which are received within the glow bars 16. The glow bars 16 are connected to a source of electrical energy and controlled through a suitable switching and temperature control means. The glow bars through radiant heat caused by the electrical resistance of the glow bars heats the chamber 17 surrounding the fining chamber. The heating chamber 17 is also surrounded by a refractory material 18 which forms an insulation and contains the heat within the furnace.

The process of manufacturing glass requires a purifying and homogenizing means to remove impurities and uniformly distribute all elements and compounds in the glass composition. In the manufacture of a high quality glass it is imperative that the air content be reduced to a minimum and also that the bubbles although small be removed from the glass as completely as possible. For this reason air is introduced in the fining chamber and also the passage communicating between the fining chamber and the melting chamber. The bubbles of air passing through the molten glass tend to combine with the minute bubbles and carry these bubbles to the surface of the glass where the air is discharged from the furnace. The process is an adhesive and cohesive process of one gas bubble forming a larger bubble through the addition of the minute bubbles as the gas passes through the molten glass. The air conduits 21 and 20 feed into the passage 4 and the fining chamber 5 respectively. The air passing through the fining chamber 5 to the stirring chamber 22 is discharged through openings in communication with the stirring chamber 22. The air introduced in the passage 4 passes through the melting chamber 3 and then moves upwardly and is deflected by the deflector flange 8 in the melting chamber. The deflector flange deflects the bubbles away from the refractory material 10 and thereby eliminates the erosive effect of the hot gases and hot glass contacting the refractory surface of the refractory 10. In this manner the erosive effect on the refractory material is substantially eliminated and the life of the furnace is likewise extended.

In the fining chamber a purifying process is accomplished. The glass then passes through the connecting passage 25 which is in communication with the fining chamber 5 and the stirring chamber 22. The temperature of the glass is reduced as it passes into the stirring chamber 22. The glass is stirred to equally distribute all elements and compounds which comprise the final glass composition. Subsequent to the homogenization of the glass, it passes through the exit orifice 26 through a forming process, and an annealing process which are not shown in this disclosure.

The glass furnace described in the preceding paragraphs operates in the following manner. The glass batch is charged in the melting chamber and then heated above its fusion temperature and flows through the passage communicating with the melting chamber and the fining chamber. The temperature necessary for flow through passage 4 is maintained by conduction of heat from the heated melting chamber and fining chamber through conduction in tube 9. As the glass is brought to a temperature higher than its melting point it flows through the passage 4 in which the air is injected. The air bubbles contained in the fused glass are removed by the process of addition of air bubbles to the molten glass. The air bubbles are discharged from the fining chamber and carry with them the tiny bubbles originally contained in the molten glass. The melting chamber, however, is not lined with a platinum but is formed by a refractory material. By including the deflector flange or a similar structure which conveys the air bubbles to a point remote of the refractory furnace wall a corrosive effect is eliminated. In this manner the air is permitted to rise to the surface of the molten glass at a point remote of the confining walls and then is discharged through an opening above the surface of the molten glass. The erosive effect on the melting chamber walls and throat is eliminated and thereby greatly extends the operating life of the glass furnace. The means for conveying the air bubbles remotely of the melting chamber walls may be any suitable means which accomplishes this purpose. The device as illustrated is a simple device but yet prolongs the operating life of the furnace very substantially.

The furnace is illustrated and described as a preferred embodiment of this invention and is claimed in the attached claims.

What is claimed is:

1. A glass furnace comprising refractory means defining a melting chamber, refractory means defining a fining chamber and a submerged throat connecting said melting chamber to said fining chamber, a platinum liner lining said fining chamber and said submerged throat to prevent erosion and to provide heat transfer through said submerged throat to assure continuity of flow from said melting chamber to said fining chamber, conduit means extending into said throat and into said fining chamber introducing gas for homogenizing and fining glass, a deflecting platinum flange integral with said platinum liner extending into said melting chamber to deflect the introduced gas away from the refractory means and prevent erosion of refractory means in said melting chamber.

2. A glass furnace comprising refractory means defining a melting chamber, refractory means defining a fining chamber, refractory means defining a throat and an enlarged radial compartment extending radially around said throat, said throat connecting said melting chamber to said fining chamber, a platinum liner lining said fining chamber and said throat to prevent erosion and provide heat transfer through said submerged throat to insure continuity of flow from said melting chamber to said fining chamber, conduit means extending into said throat and into said fining chamber introducing gas for homogenizing and fining glass, a deflecting flange integral with said liner seated on the refractory means defining said melting chamber, a resilient radial flange integral with said liner received in said compartment and resiliently engaging a radial wall in said compartment for biasing said deflecting flange to a firm seating engagement with the refractory means defining said melting chamber, means for cooling the periphery of said resilient radial flange thereby forming a sealing means to prevent leakage of molten glass between the refractory means and said liner.

References Cited by the Examiner

UNITED STATES PATENTS

| | | | |
|---|---|---|---|
| 1,970,112 | 8/34 | Wadman | 65—347 X |
| 2,688,469 | 9/54 | Hohmann | 65—180 X |
| 2,777,254 | 1/57 | Siefert et al. | 65—374 X |
| 2,900,764 | 8/59 | Long | 65—347 X |
| 3,030,736 | 4/62 | Penberthy | 65—178 X |

FOREIGN PATENTS 611,401  10/48  Great Britain.

DONALL H. SYLVESTER, *Primary Examiner.*